April 27, 1965
K. ZOSEL ET AL  3,180,881
TRANSALKYLATION OF ALUMINUM AND BORON ALKYL COMPOUNDS
Filed Sept. 9, 1960
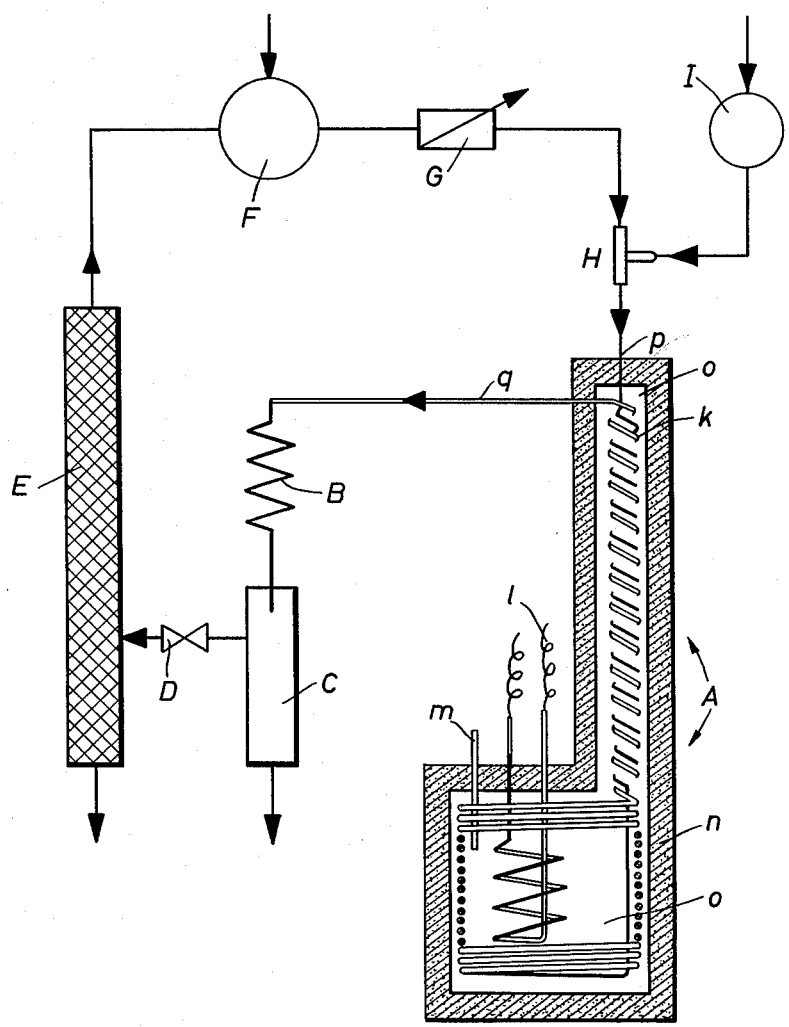
INVENTORS:
KURT ZOSEL & ERHARD HOLZKAMP
BY
Burgess, Dinklage & Sprung
ATTORNEYS United States Patent Office 3,180,881
Patented Apr. 27, 1965

3,180,881
TRANSALKYLATION OF ALUMINUM AND
BORON ALKYL COMPOUNDS
Kurt Zosel, Mulheim (Ruhr), and Erhard Holzkamp,
Ratingen, Germany, assignors to Karl Ziegler, Mulheim
(Ruhr), Germany
Filed Sept. 9, 1960, Ser. No. 54,931
Claims priority, application Great Britain, Sept. 11, 1959,
31,077/59
26 Claims. (Cl. 260—448)

This invention relates to new and useful improvements in the transalkylation of aluminum and boron alkyl compounds.

One object of the invention comprises, among others, an efficient transalkylation of aluminum and boron compounds by the use of olefins;

Another object of the invention comprises such transalkylation for the efficient production of different aluminum and boron alkyl compounds;

Still another object of the invention comprises such alkylation for the efficient obtaining of α-olefins by alkyl radical displacement in aluminum and boron alkyl compounds without the formation of substantial amounts of displacement products not corresponding to the α-olefins of the displaced radicals;

Still another object of the invention comprises an efficient substantially continuous method and, within a preferred embodiment of the invention, in a substantially cyclic arrangement for the obtaining of the foregoing objects;

A still further object of the invention comprises an apparatus for the carrying out of one or more of the foregoing objects;

The above and still further objects of the invention will be apparent from the following description and the drawings referred to therein which diagrammatically shows an embodiment of an apparatus in accordance with the invention in which the process of the invention may be effected.

As is known per example from the U.S. Patent 2,781,-410, α-olefins containing more than 3 carbon atoms can be prepared by first reacting aluminum alkyl compounds which have lower alkyl groups for example ethyl, propyl or butyl, with ethylene, to form higher aluminum alkyl compounds and then displacing the higher alkyls which are formed in a secondary action by reaction with ethylene under reaction conditions differing from those employed in the original synthesis, with the reformation of aluminum triethyl in the form of α-olefins. In the second stage, there may be employed instead of ethylene, propylene or other lower α-olefins, for example α-butylene. If aluminum tripropyl is employed as starting material and higher aluminum alkyls are built up therefrom with ethylene, and propylene is employed in the second phase of the so-called displacement reaction, and the two processes are repeated, it is possible by this combination reaction to produce any desired α-olefins of the odd-numbered series, while when ethylene or butylene is employed in the displacement phase the even-numbered α-olefins are obtained.

The two reaction stages may also be combined if the temperature is raised to about 200° C. for the action of ethylene on aluminum triethyl. Under these conditions, a "catalytic" polymerization of ethylene to form higher even numbered α-olefins takes place as a result of a continued repetition of the synthesis and displacement. This has been described in detail by Karl Ziegler and Gellert in "Brennstoff-Chemie," vol. 33 (1952), pp. 193 to 200.

This single-stage variant of the synthesis of α-olefins from ethylene permits a catalytic polymerization to higher olefins with very good yields per unit time, because at temperatures in the region of 200° C. the reactions take place very rapidly. Nevertheless, this procedure has a number of serious defects. It is, however, difficult so to control this catalytic reaction that an olefin mixture having a predetermined desired distribution results. There is a considerable tendency in this catalytic reaction for butyl-1-ene to be formed in very much larger quantities than are desired. This butylene, however is undoubtedly the least valuable reaction product of the ethylene polymerization. The higher α-olefins, for example from hept-1-ene to about octadec-1-ene, are of particular economic interest.

Other disadvantages of the direct catalytic polymerization of ethylene by aluminum trialkyls reside in that at the necessary high experiment temperatures, the α-olefins are in some cases further modified in secondary reactions; for example as a result of dimerization, they change into branched olefins. Moreover, migration of the double bond takes place to some extent in the case of some of the α-olefins, so that the substantially less valuable olefins having a double bond in the centre of the chain are formed. This is also described in the above-mentioned publication of Ziegler and Gellert. Finally, it is not possible in the case of the single-stage process to obtain olefins of the odd-numbered series as preferred reaction products, because after the very first one of the constantly repeated cycles of synthesis and displacement, only aluminum triethyl remains, even if, for example aluminum propyl is originally used in such an experiment.

Owing to these difficulties in the direct polymerization of ethylene by aluminum trialkyls, the two-stage processes have generally been preferred. An advantage of these processes is that exactly as much ethylene as is required for the desired reaction products can be initially added to the initial aluminum alkyl compound in a clearly observable and readily controllable manner and when the olefins are thereafter split off in a second stage, no change occurs in the original distribution of the sizes of the synthesized carbon chains.

However, this advantage of the two-stage process cannot be obtained without certain disadvantages. In order to facilitate the splitting-off of the olefins from the synthesis products by means of ethylene, propylene or other low olefins, a catalyst may be employed, preferably in very finely divided form. This method is described in the U.S. Patent 2,781,410, the catalyst most suited for the purpose being colloidal nickel. The reaction products remaining after the displacement are then mixtures of aluminum triethyl and for example aluminum tripropyl with α-olefins, which in addition still contain all the nickel. If it is desired to convert ethylene economically into α-olefins in a continuous process, these mixtures must be separated into the lower aluminum trialkyls on the one hand and the α-olefins on the other hand. This separation entails difficulties which are due mainly to the presence of nickel. These difficulties have only recently been overcome by certain modifications of the two-stage synthesis. Nevertheless, it would undoubtedly be highly desirable to be able to carry out the displacement phase in the course of the described reaction sequences without any additional catalyst, and especially without nickel.

Similar reactions can be used and similar difficulties are encountered in connection with boron trialkyls. A displacement reaction as applied to boron trialkyls is disclosed in U.S. Patent 2,886,599.

The process of the present invention substantially solves these problems. It has been found that a very smooth displacement can be carried out if aluminum alkyl compounds or boron alkyl compounds with alkyl groups containing at least two carbon atoms are heated at a temperature of between 200° and 340° C., preferably 280° to 320° C., for periods of from 0.1 to 10 seconds, and preferably from 0.5 to 1 second, with ethylene, propylene or other α-olefins having a different number of carbon atoms from the average carbon number of the alkyls on the aluminum or boron, the duration of the residence time being shorter as the reaction temperature is higher.

Reaction mixtures are obtained which on the one hand consist almost exclusively of straight-chain α-olefins. On the other hand, it is found that when ethylene is employed as the displacing olefin almost only ethyl, in addition to a very little butyl, is found on the aluminum or boron after completion of the reaction according to the invention. No higher alkyl groups remain attached to the aluminum or boron. It is very surprising that this process can be carried out, because it could not be expected that no secondary reactions would occur under the aforesaid conditions and that there would only be a very small formation of ethylene polymers, if any. It is particularly surprising that no further synthesis of the aluminum alkyls takes place at the high temperature of the experiment, and that it is actually possible to limit the course of the reaction to the displacement reaction. This is important because the original distribution of the sizes of the carbon chains in the alkyls and olefin is maintained only by the limitation to the displacement.

The conditions of the reaction differ fundamentally in one respect from the conditions specified in the foregoing as characteristic of the catalytic polymerization of olefins by aluminum alkyls, namely by the temperature range. The displacement reaction takes place so very much more rapidly than the synthesis reaction in the aforesaid temperature range that an exact separation between displacement reaction and building-up reaction is possible.

It was equally surprising to find that boron trialkyls would withstand the higher temperatures used, because it is known that boron trialkyls undergo different reactions at higher temperatures. More especially, at high temperatures, dehydrogenation takes place with the formation of boron heterocycles (see Angewandte Chemie, vol. 72, page 138 (1960)), and cracking of alkyl groups on the boron, boron alkyls being formed with smaller alkyl residues, such as methyl or ethyl, inter alia.

For a description of the invention, and in order that the latter may be more readily understood, the aluminum alkyls or boron alkyls may be regarded as compounds of aluminum hydride and boron hydride respectively with olefins.

It is then generally possible in accordance with the invention, in addition to producing α-olefins, to convert aluminum trialkyls or boron trialkyls by treatment with an olefin differing from the olefin attached to the aluminum hydride in the initial olefin, into the aluminum hydride compound of this new olefin. Thus, for example, aluminum tripropyl can be very smoothly converted into aluminum triethyl by treatment with ethylene (see Example 6). Depending upon the conversion conditions and the olefins employed, it is even possible to shift the aluminum hydride backwards and forwards between two olefins as desired. Thus, under certain conditions within the scope of the invention, aluminum trihexyl can be converted into aluminum propyl, while conversely aluminum hexyl can be prepared from aluminum propyl. However, the complete freedom of action in this respect is somewhat limited by the sequence of the affinities of the olefins for aluminum hydride. The olefins can be placed in the following order, in which each preceding member will displace the next following member from the corresponding aluminum alkyl, since it has greater affinity for aluminum hydride:

(1) $C_2H_4$
(2) Olefins of the general formula $RCH=CH_2$, and
(3) Olefins of the general formula $R_2C=CH_2$.

Under stoichiometric conditions, each succeeding member is substantially displaced from the associated aluminum alkyls by the preceding member. Thus, aluminum triethyl and the corresponding olefines can always be produced with ethylene from all aluminum alkyls. The same is the case with the olefins of the isobutylene type which can be displaced in accordance with the invention from the branched aluminum trialkyls by ethylene and all α-olefins. Reaction with two olefins of the same group proceed just as well if a sufficient excess of the olefin serving for the displacement is employed, with only displacement against the aforesaid sequence of affinities being difficult.

If, for example, it is desired to displace an olefin of the group mentioned under (2) by an olefin of the group mentioned under (3), this can be done by choosing an olefin of type 2, which has a substantially lower boiling point than the olefin of type 3. Thus, for example, propylene can be displaced from aluminum tripropyl by 2-methylpentene in a pressure column, propylene escaping under pressure from the top of the column.

A certain difference of degree between the behavior of boron trialkyls and that of aluminum alkyls resides in that the displacement against the affinity sequence is more readily possible in the case of boron compounds than in the case of aluminum compounds. It has already been stated, especially when the displacement reaction is repeated that, one olefine can be displaced by another against the aforesaid affinity series, but it always takes place much more readily in the direction of the affinity sequence. In the case of boron alkyls, these differences in affinity are not so pronounced, and it is therefore possible, for example without any particular difficulty, to obtain from boron tripropyl with 2-methylpent-1-ene, boron tri-2-methylpent-1-yl in addition to free propylene. In order to explain the applicability of the process of the invention, it will be pointed out that this possibility of converting boron tripropylene plays a particular part in connection with the industrially important conversion of 2-methylpent-1-ene into 4-methylpent-1-ene. As is known, boron tri-[2-methylpent-1-yl] is partially re-arranged under heat into boron tri-[4-methylpent-1-yl]. 4-methylpent-1-ene can very readily be liberated from this product of rearrangement by means of propylene by the process of the invention, boron tripropyl being simultaneously obtained, from which the displaced isohexene can readily be distilled off. By a subsequent reconversion in accordance with the invention of boron tripropyl with 2-methylpent-1-ene into boron tri-[2-methylpent-1-yl] and propylene, a ring is closed, in which the boron compounds merely constitute auxiliary substances for the conversion of 2-methylpent-1-ene into 4-methylpent-1-ene. 4-methylpent-1-ene is a basic substance of a valuable high polymer, while 2-methylpent-1-ene can very readily be obtained by dimerization of propylene, but cannot be directly converted into a useful plastic of high molecular weight. In an entirely analogous manner, the invention may be employed in the course of the conversion of the olefine $$H_2C=C-CH_2-CH_3$$
$$\phantom{H_2C=}|$$
$$\phantom{H_2C=}CH_3$$

into the isomeric olefin $$\begin{array}{c}CH_3\\ \diagdown\\ CH-CH=CH_2\\ \diagup\\ CH_3\end{array}$$

The process of the invention has here been described throughout with reference to the conversion of aluminum trialkyls into other aluminum trialkyls. It positively follows from the general knowledge of the chemistry of organo-aluminum compounds that aluminum hydride and alkyl aluminum hydrides especially dialkyl aluminum hydrides are to be regarded as obvious equivalents of aluminum trialkyls, in that they can be employed in the displacement. The reaction products are then true aluminum trialkyls, mixed with the olefins which have been split off from the hydride-containing compounds. This modification of the process is described in Example 7. When dialkyl aluminum hydrides are employed in the process of the invention, the aluminum hydride group first changes into an aluminum alkyl grouping, whereafter the alkyl residues introduced by the dialkyl hydride are replaced, in the mixed aluminum trialkyl thus formed, by others corresponding to the displacing olefin.

However, the expression "aluminum alkyl compounds" is here intended to be given a wider interpretation in another direction. It has been shown in the earlier U.S. applications 795,901 and 13,715 in the name of the same applicant that all reactions which are characteristic of true aluminum trialkyls can also be carried out with dialkyl aluminum halides, their complex compounds with potassium halides and compounds of the type $(alkyl)_2AlOR$ and $(alkyl)_2AlSR$ if certain quantities of true aluminum alkyls are added to these substances. The process of the invention is also applicable within the full scope of these applications, that is to say, the olefins may also be split off from dialkyl aluminum halides, their complex compounds with potassium halides and compounds of the formula $(alkyl)_2AlOR$ and $(alkyl)_2AlSR$, in which R represents a hydrocarbon group containing at least 2 carbon atoms, if certain quantities of true aluminum alkyls are present.

The reaction according to the invention can also readily be carried out with all types of boron alkyl compounds which correspond to the aluminum alkyl compounds, apart from dialkyl boron compounds, as these have an entirely different reactivity than dialkyl aluminum compounds. Also, any complex compounds which would correspond substantially to the aluminum compound $$KAl(C_nH_{2n+1})_2Cl_2$$

in the boron series also cannot be employed in the displacement reaction because such complex compounds do not exist.

The process of the invention may also be carried out with mixtures of aluminum alkyls and boron alkyls. Naturally, it is not necessary to use boron alkyls in which the alkyl residues attached to the boron are all the same. It is also unnecessary to employ single olefins as the olefin component and mixtures of olefins can be used.

If aluminum alkyls are used as starting products, it is particularly desirable to employ as olefins either ethylene or olefins of the general formula $H_2C=CHR$ or $H_2C=CR_2$, in which R represents a hydrocarbon group. In the last formula, both R's may be the same or different hydrocarbon groups.

If boron alkyl compounds are employed as starting materials, this preferred reactivity with particular olefins is not so pronounced. In such cases, ethylene or olefins of the general formula $H_2C=CHR$, $H_2C=CR_2$, $RCH=CHR$ or $R_2C=CHR$ may be employed, in which R represents a hydrocarbon group. In this case, the two R's or all three R's may be the same or different hydrocarbon groups. Each two R's in the aforesaid general formulae may also be connected by a closed chain of carbon atoms that is to say, cyclic olefins, such as cyclohexene, cyclooctene or methylcyclopentene, may also be employed. The possibilities of mutual conversion of boron alkyls or of replacing one part of the olefins by another in the alkyls of the boron alkyls are much broader than in the case of aluminum alkyls. This is of practical importance, for example, in connection with the process for converting 2-methylpent-1-ene into 4-methylpent-1-ene. If boron triisohexyls are prepared by heating together 2-methylpent-1-ene with other boron alkyls, for example boron tripropyl, and the reaction is so controlled that the said boron triisohexyls also contain large proportions of 4-methylhex-1-yl groups, the excess of olefin employed will frequently be rearranged entirely or partially with migration of the double bond by one position to form the 2-methylpent-2-ene

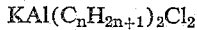

This product would be lost to the process if the possibility of displacing other olefins from boron alkyls were as difficult as it is in the case of aluminum compounds. In the case of aluminum alkyls, the reason for the greater difficulty in employing such olefins resides in that aluminum alkyls in which the aluminum is attached to secondary or tertiary carbon atoms are much more difficult to form or are less stable.

It is also possible by the process of the invention to react 2-methylpent-2-ene or olefin mixtures containing this hydrocarbon with boron tripropyl, with displacement of propylene, so that a substantial conversion from 2-methylpent-1-ene into 2-methylpent-4-ene is possible in a suitable cyclic process, as already described.

The process of the invention is now further explained with reference to displacements by ethylene, propylene or α-butylene using an apparatus in accordance with the figure of the accompanying drawing.

The apparatus consists substantially of reactor A, a condenser B, a separator C, an expansion valve D, a separator E, a circulation compressor F, a flow meter G, a mixing part H and finally an injection pump I. The reactor A consists of a steel tube $k$ 18 metres long, which has an internal diameter of 5 mm. and a wall thickness of 0.5 mm. The first and last four metres of this steel tube are coiled in the form of a spiral 120 cm. long and 8 cm. in diameter and the remaining central 10 metres of the steel tube are coiled to form a spiral about 40 cm. long and 25 cm. in diameter. Finally, the beginning and end spirals are pushed one over the other as shown in FIG. 1. The entire spiral arrangement is embedded in aluminum $o$. An electrical heating device $l$ (Backer-tube) and a tube for a thermometer $m$ are disposed in the aluminum block. The entire aluminum block is well insulated $n$ to prevent heat radiation to the outside.

PROCEDURE

The reactor is first heated to the desired reaction temperature and the entire apparatus is filled with ethylene. The ethylene is supplied to the circulation compressor F. The circulation compressor F then maintains a circulation of ethylene through the flow meter G, the mixing part H, the reactor A, the condenser B and the two separators C and E. The ethylene enters the reactor at $p$ and leaves it at $q$. The ethylene circulation is so adjusted that the residence time of the ethylene in the reactor amounts to about 0.5 to 1 second. If, for example, a pressure of about 10 atmospheres is employed, there is set up between the gas inlet $p$ and the outlet $q$ a dynamic pressure in the region of 2 to 4 atmospheres. Therefore, an ethylene pressure of 6 to 8 atmospheres then obtains in the separator C. The ethylene is expanded from there through the expansion valve D to about 1 to 3 atmospheres into the separator E, in which it further cools. The ethylene finally returns from the separator E to the circulation compressor F. The speed of flow of the ethylene, and therefore also the residence time of the ethylene in the reactor, can be verified from the flow meter G. Aluminum trialkyl or boron trialkyl (synthesis product) is then fed by the injection pump I to the mixing part H. The mixing part H consists merely of a constriction in the ethylene duct, into which there leads a nozzle for the injection of the synthesis product. The synthesis product thus enters the ethylene stream at a point at which the speed of the ethylene flow is very high and is thus carried along in atomized form therein. Therefore, from this instant onwards, the ethylene enters the reactor at $p$ together with the synthesis product. The mixture first passes through the thin spiral and is already at reaction temperature when it enters the wide spiral, i.e. the actual reaction chamber. After leaving the actual reaction chamber, the ethylene passes through the second thin spiral together with the reaction products and in doing so gives up its latent heat to the ethylene and synthesis product flowing in countercurrent thereto. The first and last 4 metres of the 18-metre long reaction tube form the heat exchanger, while the centre 10 metres form the actual reactor. Since the speed of flow in the reaction tube is high and the tube is thin-walled, and embedded in cast aluminum having good heat conductivity, the heat exchange is ideal.

The heat exchanger of the described apparatus thus has a content of about 150 cc., and the reactor itself a content of about 200 cc. The reaction product, which in this case consists of aluminum triethyl or boron triethyl and the split-off olefins, can then be continuously discharged from the separator C. A small quantity of olefins of low boiling point can finally be discharged from the separator E, which is cooled, as hereinbefore described.

A number of displacement experiments were carried out in this apparatus. In Examples 1 to 3, a synthesis product derived from aluminum tripropyl and ethylene having a mean carbon number of 9.5, an aluminum content of 6.3% and the following average composition in mole

| $C_5$ | $C_7$ | $C_9$ | $C_{11}$ | $C_{13}$ | $C_{15}$ | $C_{17}$ |
|---|---|---|---|---|---|---|
| 10 | 18 | 20 | 15 | 13 | 7 | 4 | percent was employed in each instance. It was displaced with ethylene, propylene and α-butylene. The synthesis product was obtained according to the method of U.S. Patent 2,781,410.

The average composition, i.e., the distribution of the carbon numbers in the synthesis product, was determined as follows: One part of the synthesis product was decomposed in the cold with dilute sulphuric acid, and the paraffins were separated off, washed out, dried and then separated into eight fractions in a Vigreux column. Each paraffin fraction was analyzed by gas chromatography and the distribution was deduced therefrom. Even-numbered paraffins could only be observed in traces.

The reaction products were tested:

(1) As to the quantity and nature of the alkyl residue on the aluminum, and
(2) As to the distribution and nature of the olefinic reaction products.

Re 1: The nature and quantity of the alkyl residues on the aluminum were determined as follows: One part of the reaction product was heated at 80° C in vacuo (10 mm. Hg). The olefines of lower boiling point thus distilled off. The residue was then analyzed for its percentage content of aluminum. Another part of the residue was decomposed with 2-ethyl-hexan-1-ol and the quantity of gas obtained was determined. Finally, the composition of the gas was tested by mass spectrography.

Re 2: The distribution and the nature of the olefinic reaction products were determined as follows: One part of the reaction product was decomposed in the cold, and the olefins were separated off, washed out, dried and separated into eight fractions in a Vigreux column. Each olefin fraction was analyzed by gas chromatography and the distribution was deduced therefrom. In addition, the ratio of α-olefins to β-olefins was determined by infrared analysis. It is here to be noted that the olefins split off in all the experiments were pure straight-chained α-olefins. Olefins having a mid-position double bond could be detected only in traces.

In the examples, all the necessary particulars for assessing the course of the reaction are given, as obtained with the aid of the analytical methods as hereinbefore described. The separation of the reaction mixtures as obtained from the so-called "built-up products" into the products of the process of the invention (aluminum alkyls and olefins) is not described in detail, since this is a known problem which has already been technically solved. This separation can be effected by distillation in suitable columns, this distillation affording no particular difficulties because no nickel is present in the products of the process of the invention. The aluminum alkyls in the reaction products according to the invention may also be converted into the 2:1-compounds with potassium fluoride of the general type $KF.2AlR_3$, the olefins can be directly separated from the latter by distillation in vacuo and the aluminum alkyls can be split off from the distillation product again by heating at about 180° C. with simultaneous further lowering of the pressure and thus separated from the olefins.

The following Examples 1 to 7 illustrate the process in what is regarded as its preferred form.

*Example 1*

The synthesis product was displaced with ethylene in the apparatus and process hereinbefore described. An ethylene pressure of 10 atmospheres was employed at the inlet to the reactor, while the residence time of the ethylene in the reactor amounted to 0.7 second. The reaction temperature amounted to 285° C. 5 kilograms of synthesis product were introduced per hour by means of the injection pump I. The molar ratio of aluminum alkyl to ethylene was 1:35. A total of 25 kg. of built-up product was reacted in 5 hours. 30 kg. of reaction product in all were extracted from the separators C and E. The reaction product was analyzed in the manner hereinbefore described. In the decomposition of the aluminum alkyl, 96% of the theoretically possible quantity of gas was obtained. The gas consisted to the extent of 98.7% of ethane and to the extent of 1.3% of butane. The displacement was thus complete. The olefins split-off had the following composition:

| $C_5$ | $C_7$ | $C_9$ | $C_{11}$ | $C_{13}$ | $C_{15}$ | $C_{17}$ |
|---|---|---|---|---|---|---|
| 10 | 18 | 20 | 15 | 13 | 7 | 4 |

Olefins having a mid-position double bond could be detected only in traces. The displaced olefins had the same distribution of carbon numbers as the alkyl groups in the synthesis product. Therefore, no further synthesis took place during the displacement reaction. This is also apparent from the quantity proportions. The 25 kg. of synthesis product employed should have given 30.07 kg. of reaction product (aluminum triethyl+olefin) while 30 kg. were obtained. In the further working up, 6.5 kg. of aluminum triethyl and 24 kg. of olefin were obtained.

*Example 2*

In the same apparatus, 35 kg. of the same synthesis product were reacted with propylene. An operating pressure of 10 atmospheres was employed, the residence time was 0.5 second and the reaction temperature was 305° C. 7 kg. of synthesis product were reacted per hour. The molar ratio of aluminum trialkyl to propylene was 1:22. 45.5 kg. of reaction product were obtained. This product was analyzed as in Example 1. The aluminum alkyl gave 90% of the theoretical quantity of gas. The gas was made up of 0.2% of hydrogen, 99% of propane and 0.8% of pentane. The displaced olefins had the following composition:

| $C_5$ | $C_7$ | $C_9$ | $C_{11}$ | $C_{13}$ | $C_{15}$ | $C_{17}$ |
|---|---|---|---|---|---|---|
| 10 | 18 | 20 | 15 | 13 | 7 | 4 |

The further working up gave 12 kg. of aluminum tripropyl and 30 kg. of olefin mixture.

*Example 3*

In the same apparatus, 20 kg. of the same synthesis product were reacted with α-butylene. An operating pressure of 7 atmospheres was employed, the residence time was 0.6 second and the reaction temperature was 300° C. 4 kg. of built-up product were reacted per hour. The molar ratio of synthesis product to butylene was 1:33. 28 kg. of reaction product were obtained. The reaction product was analyzed as in Example 1. The aluminum alkyl gave 86% of the theoretically possible quantity of gas. The gas consisted of 0.3% of hydrogen, 99% of n-butane and 0.7% of n-pentane. The displaced olefins had the following composition:

| $C_5$ | $C_7$ | $C_9$ | $C_{11}$ | $C_{13}$ | $C_{15}$ | $C_{17}$ |
|---|---|---|---|---|---|---|
| 10 | 18 | 20 | 15 | 13 | 7 | 4 |

In Examples 4 and 5, a synthesis product derived from aluminum triethyl and ethylene having a mean carbon number of 8, an aluminum content of 7.4% and an average composition in mole percent of

| $C_4$ | $C_6$ | $C_8$ | $C_{10}$ | $C_{12}$ | $C_{14}$ | $C_{16}$ |
|---|---|---|---|---|---|---|
| 8 | 20 | 21 | 17 | 11 | 7 | 4 | was employed, which was obtained according to the method of U.S. Patent 278,410.

*Example 4*

In the same apparatus, 20 kg. of the synthesis product were reacted with ethylene. An operating pressure of 10 atmospheres was employed, the residence time was 0.8 second and the reaction temperature was 280° C. 5 kg. of synthesis product were reacted per hour. The molar ratio of synthesis product to ethylene was 1:29. The reaction product was analyzed as in Example 1. The aluminum alkyl gave 96% of the theoretically possible quantity of gas. The gas consisted of 98.5% of ethane and 1.5% of butane. The olefins split off had the following composition:

| $C_4$ | $C_6$ | $C_8$ | $C_{10}$ | $C_{12}$ | $C_{14}$ | $C_{16}$ |
|---|---|---|---|---|---|---|
| 8 | 20 | 21 | 17 | 11 | 7 | 4 |

The working up of the reaction product gave 6 kg. of aluminum triethyl and 18 kg. of olefins.

*Example 5*

In the same apparatus, 20 kg. of the synthesis product were reacted with propylene. An operating pressure of 10 atmospheres was employed, the residence time was 0.6 second and the reaction temperature was 290° C. 3 kg. of synthesis product were reacted per hour. The molar ratio of built-up product to propylene was 1:42. 27 kg. of reaction product were obtained. The reaction was again analyzed as in Example 1. The aluminum alkyl gave 91% of the theoretical quantity of gas. The gas consisted of 0.1% of hydrogen, 99.2% of propane and 0.7% of butane. The olefins split off had the following composition:

| $C_4$ | $C_6$ | $C_8$ | $C_{10}$ | $C_{12}$ | $C_{14}$ | $C_{16}$ |
|---|---|---|---|---|---|---|
| 8 | 20 | 21 | 17 | 11 | 7 | 4 |

*Example 6*

In the same apparatus, 10 kg. of aluminum tripropyl were reacted with ethylene. An operating pressure of 10 atmospheres was employed, the residence time was 0.6 second and the reaction temperature was 290° C. 2 kg. of aluminum tripropyl were reacted per hour. The molar ratio of aluminum tripropyl to ethylene was 1:30. 7.3 kg. of pure aluminum triethyl and 8 kg. of propylene were obtained. The aluminum trialkyl gave 95% of the theoretical quantity of gas. The gas consisted of 98.4% of ethane, 0.9% of propane and 0.5% of butane.

*Example 7*

In the same apparatus, 15 kg. of aluminum diisobutylhydride were reacted with propylene. An operating pressure of 10 atmospheres was employed, the residence time was 0.8 second and the reaction temperature was 265° C. 5 kg. of aluminum diisobutyl hydride were reacted per hour. The molar ratio of aluminum diisobutyl hydride to propylene was 1:9. 16.5 kg. of aluminum alkyl and 11.7 kg. of isobutene were obtained. The aluminum alkyl gave 92% of the theoretical quantity of gas, and the gas consisted of 0.2% of hydrogen and 99.8% of propane.

It has been stated and established by experiment that an essential feature of the invention resides in that olefins are split off from higher aluminum alkyls by displacement without the formation of polymers of the displacing olefin, more especially of the ethylene, and without the displaced olefins undergoing any modification of their original distribution and structure.

The following Examples 8 to 11 are intended to show how the results of the process change in the neighborhood of the stated limits of the reaction conditions.

*Example 8*

In the same apparatus, 3 kg. of the synthesis product employed in Examples 1 to 3 were reacted with ethylene. A temperature of 200° C. and an operating pressure of 50 atmospheres were employed. 50 kg. of synthesis product were reacted per hour. The residence time amounted to 2 seconds. The molar ratio of synthesis product to ethylene amounted to 1:1500. 3.4 kg. of reaction product were obtained and analyzed as in Example 1. The aluminum alkyl gave on decomposition with 2-ethylhexanol 65% of the theoretically possible quantity of gas. The gas consisted of 90% of ethane, 3% of butane, 2% of propane and 5% of pentane. The olefins had the following composition:

| $C_5$ | $C_7$ | $C_9$ | $C_{11}$ | $C_{13}$ | $C_{15}$ | $C_{17}$ |
|---|---|---|---|---|---|---|
| 10 | 18 | 20 | 15 | 13 | 7 | 4 |

If the displacement had been complete, 3.59 kg. of reaction product would have been obtained, but only 3.4 kg. were obtained. The displacement was thus not yet complete. This is also indicated by the quantity of gas obtained in the decomposition of the contact. The split-off olefins on the other hand, have the original distribution. 1970 g. of olefins were obtained instead of the calculated quantity of 2800 g. The result of the experiment can be regarded as useful despite the fact that the conversion was not complete. On repetition of the experiment and lengthening of the residence time to 4 seconds, the result of the experiment was similar to that of Example 1.

*Example 9*

The procedure of Example 8 was followed, but a residence time of 8 seconds and an ethylene pressure of 100 atmospheres were chosen. The starting material was a synthesis product of aluminum tripropyl and ethylene having an average carbon number of 10.5 with 5.73% of aluminum. From 2000 g. of synthesis product injected into the apparatus, 3350 g. of reaction product were obtained instead of the calculated quantity of 1890 g., i.e. 900 g. of ethylene were additionally polymerized in secondary reactions beyond the pure displacement. These secondary reactions are the synthesis of the aluminum triethyl formed in the displacement to form even-numbered higher aluminum alkyls, followed by the displacement of these even-numbered carbon chains in the form of olefins. This is clearly apparent from the determined distribution of the olefins in the reaction product. This distribution was as follows:

| $C_4$ | $C_5$ | $C_6$ | $C_7$ | $C_8$ | $C_9$ | $C_{10}$ | $C_{11}$ | $C_{12}$ | $C_{13}$ | $C_{14}$ | $C_{15}$ | $C_{16}$ | $C_{17}$ |
|---|---|---|---|---|---|---|---|---|---|---|---|---|---|
| 8 | 5 | 16 | 12 | 5 | 14 | 2 | 17 | 1.5 | 11 | 1 | 5 | 1.5 | 2 |

2750 g. of olefin were obtained instead of the calculated 1890 g.

It will be appreciated that, in addition to the odd-numbered olefins emanating from the pure reaction according to the invention, certain quantities of the even-numbered olefins are formed by the secondary reactions. The quantities of these even-numbered products are in all 34.5%, against the 65.5% of the odd-numbered olefins according to the invention. Consequently, under the aforesaid conditions, the preponderant part of the reaction products was converted in accordance with the invention.

In this experiment, 65% of ethyl groups, 27% of butyl groups and 3% of hexyl groups were attached to the aluminum in the reaction products. It can be seen from this that about ⅔ of the total reaction proceeded in accordance with the invention, while ⅓ of the material reacted beyond the object aimed at by the invention.

A small change in the residence time, in the temperature and in the pressure thus immediately results in a substantial improvement, as is shown by the following example:

Example 10

The procedure of Example 1 is followed, using the product of Example 9, but with an ethylene pressure of 50 atmospheres at 240° C. and with a residence time of 4 seconds. From 4000 g. of synthesis product, 4900 g. of reaction product were obtained, i.e., only slightly more than the calculated quantity. The distribution of the olefins was:

| $C_4$ | $C_5$ | $C_6$ | $C_7$ | $C_8$ | $C_9$ | $C_{11}$ | $C_{13}$ | $C_{15}$ | $C_{17}$ |
|---|---|---|---|---|---|---|---|---|---|
| 1.5 | 7.5 | 1 | 17.5 | 0.5 | 20 | 25 | 16 | 7.5 | 3 |

3800 g. of olefins were obtained instead of the calculated 3780 g.

It will be appreciated that, apart from the total quantity of 3% of olefins containing 4, 6 and 8 carbon atoms, only the correct odd-numbered olefins are obtained.

After the reaction, 82% of ethyls and 14% of butyls were attached to the aluminum. Under the aforesaid conditions, therefore, just the very beginnings of the complicating secondary reactions can be detected.

Examples 9 and 10 show at the same time how the process can be adjusted in practice by a small but systematic variation of the conditions within the scope of the invention to obtain optimum results when the process has not yet proceeded with the best results under any arbitrarily chosen conditions.

Finally, the following example illustrates a further experiment which is clearly not within the scope of the invention.

Example 11

In the same apparatus 2 kg. of the same synthesis product as used in Example 1 were reacted with ethylene. The reaction temprature was 260° C., the operating pressure 200 atmospheres and the residence time 15 seconds. 50 g. of synthesis product were reacted per hour. 6.5 kg. of reaction product were obtained instead of the calculated 2.4 g. On hydrolysis of a specimen, 70% of the theoretically possible quantity of gas was obtained. The gas consisted of 66% of ethane and 34% of butane. It can be concluded from this that 30% of alkyl residues having more than 4 carbon atoms must have remained on the aluminum. The olefins had the following composition:

| $C_4$ | $C_5$ | $C_6$ | $C_7$ | $C_8$ | $C_9$ | $C_{10}$ | $C_{11}$ | $C_{12}$ | $C_{13}$ | $C_{14}$ | $C_{15}$ |
|---|---|---|---|---|---|---|---|---|---|---|---|
| 28 | 3 | 18 | 6 | 7 | 6 | 5 | 8 | 4 | 4 | 3 | 2 |

5400 g. of olefins were obtained instead of the calculated 1840 g.

The sum of the even-numbered olefins is now 65%, i.e., about ⅔ of the reaction products have been newly formed in the catalytic polymerization of ethylene, and only ⅓ corresponds to the displacement according to the invention. This also corresponds to the aforesaid ratio between the calculated quantities and the quantities of reaction products obtained. In addition, it will be observed that a relatively large quantity of ethylene has been converted into butene. If the process of the invention is thus omitted from the prior art, the residence times according to the invention are between 0.1 and 10 seconds. The reaction product is then to be cooled to about 100° C. The above-described experimental apparatus shows a method of carrying out the reaction with these extremely short reaction times in an economically favorable manner. In a reactor having a capacity of, for example 1 litre, 35 to 50 kg. of synthesis products can be reacted per hour.

It has also been stated in the foregoing that an excess of the displacing olefin is employed. Good results are obtained with a molar ratio of aluminum trialkyl to olefin of 1:5 to 1:00. However, these figures are not absolutely critical. Useful results have also been obtained in the case of the use of ethylene in a molar ratio of 1:2, while on the other hand a ratio of 1:1500 was employed in Example 8.

The following example shows that it is also possible to work against the affinity sequence defined in the description.

Example 12

In the described apparatus, 4 kg. of aluminum triethyl were reacted with propylene. An operating pressure of 10 atmospheres was employed, a reaction temperature of 300° C. and a residence time of 0.4 second. The molar ratio of aluminum triethyl to propylene was 1:700. 2 kg. of aluminum triethyl were pumped in per hour. 4.3 kg. of reaction product were obtained. On decomposition of the reaction product with 2-ethylhexanol, 90% of the theoretically possible quantity of gas was obtained. The gas consisted of 71% of ethane, and 29% of propane.

This experiment shows that ethyl groups may very well be replaced by propyl groups in accordance with the invention. The reaction was at first incomplete, but it can very readily be completed by distilling the reaction product in vacuo in a column. About 75% of the fraction having a boiling point of 90° C. (2 Torr.) can then be separated off, which consists of aluminum triethyl with a few percent of aluminum propyl, while substantially pure aluminum tripropyl remains in the residue. By repeating the operation with the distillate, any desired degree of conversion of the aluminum ethyl into aluminum propyl can be obtained.

It has been stated in the foregoing that the invention makes it possible to split off olefins from "aluminum alkyl compounds" by displacement with other olefins. The process has been explained in most examples with reference to higher aluminum alkyls of complex composition, such as can be obtained in the course of the known synthesis reaction from aluminum triethyl or aluminum tripropyl.

However, Examples 6, 7 and 12 have already explained the process with reference to unitary aluminum alkyls. In this connection, it is once again emphasized that the problem of the "transolefinization" of organo-aluminum compounds arises in many different forms in the general field of the technical use of organic aluminum alkyls, so that it appears to be just as desired in practice to displace a higher olefin from a higher aluminum alkyl by a low olefin, as vice versa. For example, molecular sizes of long-chained aliphatic compounds of particularly industrial interest lie substantially between $C_{10}$ and $C_{18}$, and on the other hand also around $C_{30}$ (wax alcohols and wax acids). In the production of long-chained aliphatic compounds from ethylene, therefore, the problem arises inter alia of changing from the boundary terms ($C_{16}$, $C_{18}$, $C_{20}$) of one economically interesting field to the other interesting field comprising higher carbon numbers. Olefins containing from about 16 to about 20 carbon atoms must then be converted back into their aluminum compounds in order that they may be further built up with ethylene. The process of the invention affords the possibility of achieving this object with the particularly cheap aluminum tripropyl, or of using the higher olefins to liberate the lower olefins from built-up products of medium molecular size. According to Example 2, aluminum tripropyl is obtained as a by-product. It is no longer essential to employ in the preparation the aluminum triisobutyl hitherto solely employed for this purpose, but any desired aluminum alkyls may be employed such as are obtained in the course of industrial organo-aluminum synthesis. The following examples illustrate such possibilities.

*Example 13*

14 kg. of α-decene are mixed with 2.6 kg. of aluminum tripropyl are pumped through a spiral copper coil 15 m. long and 4 mm. in diameter, which is heated at 300° C., the residence time being 10 seconds. A superatmospheric pressure is immediately set up in the capillaries by the split-off propylene which is bled off from the lower end of the coil together with the liquid reaction product. In order to check the course of the reaction, a specimen of the reaction product is heated in vacuo for a short time at 100° C. in order to remove the dissolved propylene, and a weighed quantity thereof is then decomposed with water. When an appreciable quantity of propane thus develops, the reaction product is passed through the tube a second time, preferably with a residence time reduced to 5 seconds. The reaction mixture then consists half of aluminum tridecyl and half of decene. The decene is distilled under 0.01 to 0.1 Torr. into a low-cooled receiver at a bath temperature up to 120° C., and aluminum tridecyl are obtained as residue.

*Example 14*

8 kg. of a synthesis product of aluminum triethyl and ethylene having an average carbon number of 5 (aluminum content 12.5%) are mixed with 25 kg. of α-octadecene and passed through a copper coil heated at 320° C. with a residence time of 5 seconds. The reaction product is in this case a balanced mixture in which, in addition to free octadecene, unmodified lower aluminum alkyls, octadecyl aluminum and the olefins corresponding to the synthesis product are present. The reaction product is heated in vacuo in a bath at 100° C., whereafter about 2.2 kg. of a distillate are obtained, consisting of a mixture of straight-chained α-olefins whose carbon numbers are from 4 to 10. The residue is again passed in the same way through the heated coil and the operation is repeated a third time if necessary. Finally the reaction product is freed as completely as possible from all volatile products in a continuous liquid film evaporator under about 0.01 Torr., the heating temperature being raised to 150° C. About 7 kg. of split-off olefins and about 26 kg. of aluminum trioctadecyl having an aluminum content of 3.5% are finally obtained. The distillate can be divided in a suitable column into the following fractions: but-(1)-ene about 990 g., hex-(1)-ene about 1560 g., oct-(1)-ene about 1620 g., dec-(1)-ene about 1400 g., dodec-(1)-ene about 850 g., tetradec-(1)-ene about 450 g., hexadec-(1)-ene about 210 g. The quantities are calculated in each instance from mid-point to mid-point of the rising branches and of the boiling curve.

*Example 15*

In the apparatus employed in Example 1 3.8 kg. of a synthesis product of dipropylene aluminum chloride having a mean carbon number of 9.5, prepared according to the method of U.S. patent application 795,901, issued as U.S. Patent No. 3,013,043 on December 12, 1961, are treated with ethylene under a pressure of 10 atmospheres. The synthesis product employed contained about 20% of the corresponding aluminum trialkyl as a result of its preparation, which aluminum trialkyl had acted as catalyst during the synthesis reaction. Temperature 280° C., residence time 0.3 second, molar ratio of synthesis product to ethylene 1:100. The aluminum alkyl gave with ethyl hexanol 80% of the theoretically possible quantity of gas. The gas consisted of 98% of ethane and 2% of butane. The olefins split off had the following composition:

| $C_5$ | $C_7$ | $C_9$ | $C_{11}$ | $C_{13}$ | $C_{15}$ | $C_{17}$ |
|---|---|---|---|---|---|---|
| 10 | 18 | 20 | 15 | 13 | 7 | 4 |

3000 g. of olefins were obtained in all instead of 3160 g. as calculated.

*Example 16*

An experiment was carried out in exactly the same way as that described in the preceding example, using a product consisting of 10% of true aluminum trialkyl ($AlR_3$) and 90% of butoxy-aluminum dialkyl ($C_4H_9OAlR_2$), in which R represents alkyl groups having a mean carbon number of 9.5. Temperature 280° C., ethylene pressure 10 atmospheres, quantity pumped in per hour 2 kg., 3.9 kg. in all, residence time 0.8 second. Obtained: 4.5 kg. of reaction product, which gave 83% of the theoretically possible quantity of gas on decomposition with ethyl hexanol. The gas consisted of 97% of ethane and 3% of butane. The olefins split off had the following composition:

| $C_5$ | $C_7$ | $C_9$ | $C_{11}$ | $C_{13}$ | $C_{15}$ | $C_{17}$ |
|---|---|---|---|---|---|---|
| 10 | 18 | 20 | 15 | 13 | 7 | 4 |

A total of 2850 g. of olefins was obtained instead of 2900 g. as calculated.

*Example 17*

195 grams of potassium aluminum diethyl dichloride are mixed with 15 grams of aluminum triethyl and the mixture is transferred under a nitrogen atmosphere into an autoclave into which 200 grams of ethylene are then forced in under pressure. With an autoclave capacity of 1 litre, the pressure temporarily rises to 160 atmospheres when subsequently heating to 150–160° C. The pressure then decreases to 20 atmospheres during the course of 5 hours. The autoclave is now allowed to cool, the superatmospheric pressure is released and the liquid contents are discharged. The product is homogenous and furnishes 55 grams of a mixture of olefins as a distillate when heated to 80° C. under vacuum. In this mixture, butylene, hexene, octene, and decene of which about 80% are present as straight-chain alpha olefins can be detected by gas chromatography. The residue from this distillation consists of the potassium chloride complex compound of higher aluminum alkyls having the approximate composition

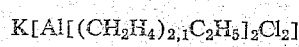

The reaction product obtained is then further worked up in accordance with the invention under the conditions of Example 15. The first receiver of the apparatus is maintained at about 100° C. and the olefins having the highest degree of volatility are separated off in a second low-cooled receiver. The content of the first receiver consists of two immiscible layers. The upper layer consists of olefins containing from 8 to 16 carbon atoms, while the second receiver contains liquid olefins containing from 4 to 8 carbon atoms. The lower layer consists of the molten complex compound $K[Al(C_2H_5)_2Cl_2]$, in which substantially no more olefins are in solution. 135° g. of olefin mixture in all are obtained, which mixture again has the usual Poisson distribution of the various carbon numbers. The highest olefins occurring in appreciable quantities are those containing 16 carbon atoms. The lower layer weighs 1.95 kg., i.e., as much of this complex compounds is recovered as was initially employed.

The particular advantage of this modification of the process resides in that the olefins separate spontaneously from the organic aluminum compound and that the aluminum compound is immediately recovered in the form in which it can be used for the synthesis after further activation.

Example 18

11 litres of a mixture of 395 g. (2.81 mol.) of boron tripropyl and 7160 g. (85.3 mol.) of 2-methylpent-1-ene are employed as starting mixture. With various temperatures and pressures in the reactor (free reaction space=250 cc.), the results indicated in the following table are obtained after a single short-time reaction:

| Experiment | Quantity of mixture, litres | Conditions temp. | Pressure, atm. | Mean residence time, sec. | Yield from quantity of propene, percent of theory | Composition of the isohexyl groups at the boron | | | Composition of the starting olefins | | | |
|---|---|---|---|---|---|---|---|---|---|---|---|---|
| | | | | | | 2-1 | 4-1 | 4-2 | 2-1 | 4-1 | 4-2 | 2-2 |
| Without isomer: | | | | | | | | | | | | |
| A | 1.5 | 250° | 3.2 | 1.1 | 12.8 | 100 | | | 100 | | | |
| B | 3.0 | 300° | 3.0 | 1.1 | 39.4 | 100 | | | 100 | | | |
| C | 3.0 | 300° | 6–7 | 1.0 | 42.2 | 100 | | | 100 | | | |
| With isomer: | | | | | | | | | | | | |
| D | 1.5 | 350° | 3.2 | 1.1 | 44 | 73.5 | 24.4 | 2.1 | 60 | b.p. | 12 | 25 |
| E | 1.5 | 350° | 1.2 | 1.6 | 41 | 51.2 | 43.3 | 2.1 | 40 | | 15 | 30 |

As will be apparent from the table, no isomerization occurs in experiments A, B and C, which are carried out at 250° and 300° C. respectively, that is to say, the 2-methylpent-1-ene originally introduced is not modified, and in addition the newly formed isohexyl groups on the boron consist exclusively of the 2-methylpent-1-yl group. On the other hand, in the case of experiments D and E a more or less intensive isomerization occurs owing to the increased temperature (350° C.) as a function of the mean residence time in the reactor.

The yields in all the experiments from A to D are quantitative, that is to say, no proportions of substance are lost as a result of secondary reactions.

Example 19

The mixture reacted in Example 18 in experiment B and consisting of boron tripropyl and 2-methylpent-1-ene is again reacted at 300° C. after the propene formed has been separated off. After three applications of the short-time reaction, the displacement of the propyl groups took place up to the extent of about 85%, as will be apparent from the following table:

Example 20

A mixture of 1.82 kg. of boron triisobutyl and 14 kg. of dec-1-ene is reacted at an operating pressure of about 1 atm. and with a residence time of about 1 sec. at 300° C. in the same reactor (about 3 litres per hour). After a single short-time passage, a total of 1.3 kg. of isobutylene (about 80% yield) is obtained in addition to 14.5 kg. of a mixture of dec-1-ene and boron alkyls. After separation of the liberated isobutylene, the liquid is again passed through the reactor under the same conditions, whereby the remaining 0.28 kg. of isobutylene is obtained. The colorless liquid is freed from the excess decene by distillation under reduced pressure. There are obtained in all 4.2 kg. of boron tridecyl (boron determination=2.5% of boron according to the benzoic peracid method).

Example 21

26 kg. of boron tri-(4-methylpent-1-yl) are reacted with an excess of propylene. With an operating pressure of 10 atmospheres, a residence time of about 1 second and a reaction temperature of 320° C., about 5 kg. of the mixture are passed through per hour. The molar ratio of boron trialkyl to propylene amounts to about 1:30. From 36 kg. of reaction product, 24 kg. of 4-methylpent-1-ene are obtained in addition to 11 kg. of boron tripropyl. The residue from the distillation (about 1.5 kg.) consists of unreacted boron triisohexyl, which can be fed back for reaction with propylene.

Example 22

3.5 kg. of boron tri-n-octyl are reacted with ethylene in the course of 1 hour (operation pressure: 10 atmospheres, residence time: about 1 second, reaction temperature: 300° C.). After a single throughput of the boron trioctyl, a colorless, extremely air-sensitive liquid is obtained, from which a total of 850 g. of boron triethyl (B.P.=94 to 95° C.) can be distilled in a packed column. In addition, 3 kg. of n-oct-1-ene are obtained, B.P. 120–121° C.

Example 23

The starting mixture consists of 54.4 g. (0.386 mol.) of boron tripropyl and 980 g. (11.6 mol.) of an olefin mixture having the following composition:

17% of 2-methylpent-1-ene
68% of 2-methylpent-2-ene
5% of 4-methylpent-2-ene (cis- and trans-compound)
4% of 4-methylpent-1-ene

| Experiment | Quantity of mixture, litres | Conditions temp. | Pressure, atm. | Mean residence time, sec. | Yield from quantity of propene, percent of theory | Composition of the isohexyl groups at the boron | | | Composition of the starting olefins | | | |
|---|---|---|---|---|---|---|---|---|---|---|---|---|
| | | | | | | 2-1 | 4-1 | 4-2 | 2-1 | 4-1 | 4-2 | 2-2 |
| B₁ | 3.0 | 300° | 3.0 | 1.1 | 0–39.4 | 100 | | | 100 | | | |
| B₂ | 2.03 | 300° | 3.0 | 1.1 | 39–63.9 | 100 | | | 97 | | 2 | b.p. |
| B₃ | 2.07 | 300° | 3.5 | 1.1 | 63–84.9 | 99 | | 1 | 94 | | 5 | b.p. |

By a single short-time reaction at 300° C., the result shown in the following table is obtained:

| Quantity of mixture, litres | Conditions temp. | Pressure, atm. | Mean residence time, sec. | Yield from quantity of propene percent of theory | Composition of the isohexyl groups at the boron | | | Composition of the starting olefins | | | |
|---|---|---|---|---|---|---|---|---|---|---|---|
| | | | | | 2-1 | 4-1 | 4-2 | 2-1 | 4-1 | 4-2 | 2-2 |
| 1.3 | 300° | 3.5 | 1.2 | 26 | 72 | 23.3 | 4.7 | 17 | 5 | 17 | 61 |

*Example 24*

A mixture of 0.9 kg. of boron triisobutyl and 24 kg. of cyclohexene (molar ratio 1:30) is reacted in the described reactor (pressure in the reactor=2.5 atm., mean residence time=1 second; temperature=300° C.). 5 litres of liquid are injected per hour. The isobutylene formed is distilled off from the mixture obtained after the reaction. The reaction product freed from the isobutene is thereafter passed through twice under the same conditions. There is obtained a total of 0.8 kg. of isobutylene and 24.5 kg. of a solution of boron tricyclohexyl in cyclohexene. When the excess of olefin has been distilled off, 125 kg. of boron tricyclohexyl, M.P. 120° C., is obtained.

*Example 25*

In accordance with Example 2, there are obtained from a mixture of 360 g. of boron triisobutyl and 8 kg. of 1-vinylcyclohex-3-ene (molar ratio $BR_3$:olefin=1:37) after a single short-time reaction at 300° C. (pressure in the reactor=1 atm.; mean residence time=1 second), 300 g. of isobutylene and a mixture of the boron trialkyl formed with the excess of olefin. The latter is distilled off and leaves an unsaturated boron trialkyl formed, with the excess of olefin. The latter is distilled off and leaves an unsaturated boron alkyl containing 3.2% of boron (according to the benzoic peracid method). By oxidation and subsequent hydrolysis of this compound, 4-($\beta$-hydroxyethyl)-cyclohex-1-ene, B.P./16 mm. Hg 104.5° C., is obtained (this reaction was carried out only to prove the constitution of the boron alkyl obtained).

In lieu of the specific olefins used in the various examples, other olefins may be substituted with similar results, be they other $\alpha$-olefins of either straight or branched chain or be they cyclic olefins or cyclic vinyl alkylenes. Thus, specifically, instead of the cyclohexene in Example 24, methyl-ethyl cyclohexene, cyclopentene or methyl cyclopentene, cyclooctene or alkyl cyclooctene may be used with substantially similar results. Similarly, in lieu of vinyl cyclohexene as specified in Example 25, other vinyl cycloalkylenes, as for instance vinyl cyclopentene, vinyl cyclooctene and similar vinyl cycloalkylenes may be employed.

It is apparent from the foregoing disclosure that the term "olefin," as used herein, designates any ethylenically unsaturated hydrocarbon, including straight- and branched-chain $\alpha$-olefins and olefins with an intermediate double bond as well as cyclic olefins including cyclic alkenes, alkyl cycloalkenes, alkylene cycloalkyls and alkylene cycloalkenes. Within the preferred embodiment of the invention, the olefins are advantageously vaporizable or substantially gaseous at the temperature of the transalkylation, i.e., displacement reaction, so as to be passed, substantially in the form of a gas current, through the reaction zone. It is understood, however, that the term "olefin" in relation to any specific aluminum and boron alkyl compound, which it is intended to transalkylate, is so selected that the olefin is a displacement olefin for the alkyl radical to be replaced, i.e., that it is an olefin which, at the reaction temperature and within the reaction time, will react to replace said alkyl radical in the form of its corresponding olefin to form an alkyl radical substantially corresponding to the olefin selected.

As shown in the foregoing and as demonstrated by some of the examples herein, the expression "olefin" broadly includes dienes, i.e., hydrocarbons carrying a double ethylenic unsaturation. The term "olefin," as used herein does not only designate a single olefin, but also includes mixtures of olefins, at least one of which and preferably all of which constitute "displacement" olefins.

As is further apparent from the foregoing disclosure, the aluminum and boron alkyls useful in accordance with the invention are those having alkyl radicals of straight- or branched-chain configuration and include alkylene radicals and in general any radical corresponding to any of the olefins of the above given scope and definition. Such aluminum and boron alkyl compounds include those having mixed alkyl radicals as well as those in which a mixture of such alkyl compounds with different alkyl radicals is used.

It is also understood that the term "aluminum and boron compounds," as used within the scope of this invention, include compounds which have become known in organo-metal chemistry to act like and are the usual equivalents of the trialkyl compounds and thus include, for instance, the alkyl hydrides, the dialkyl halides, dialkyl alkoxy or aryloxy compounds and alkyl or aryl mercapto-aluminum dialkyl compounds, etc. Such equivalency is particularly known and noted for the aluminum dialkyl derivatives of the just recited type and includes their complex compounds with alkali metal halides and hydrides as well as such halide and hydride complex compounds with trialkyl aluminum. Within the preferred embodiment of the invention, the aluminum alkyls used are advantageously fluidizable for injection into the olefin current for substantially intimate admixture therewith and are preferably substantially vaporizable at the temperature of reaction so as to essentially constitute a substantially single-phase mixture in a current of olefins substantially gaseous at said temperature.

As has been hereinabove detailed, the temperature of reaction is above about 200° C. and, as evident, should be below the temperature at which during the reaction period appreciable amounts of displacement products are formed, which do not correspond to the replaced alkyl radical, i.e., in that they have either undergone isomerization or degradation to a lower C-number olefin. This upper temperature lies in the majority of cases between about 200 and 340° C. and bears an inverse relationship to the reaction time, in that lower reaction times will permit and sometimes require higher reaction temperatures, whereas more extended reaction time permits or requires a lower reaction temperature. Although a relatively small percentage of isomerization or degradation products may be tolerable in a given case, it is preferred to coordinate the reaction temperature and time so that there is essential freedom from isomerization and/or degradation.

The pressure is not critical for the displacement reaction per se. As illustrated above, by way of one embodiment of the invention, it is however of advantage to maintain a certain pressure in the reaction zone and preferably a pressure of at least 2 atmospheres. It is for example possible to maintain the reaction pressure in the range of between 2 and about 20 atmospheres but if desired there also can be used much higher pressures, for example a pressure up to about 200 atmospheres or more. Beside other advantages this permits a better control of reaction conditions, especially with respect to the residence time of the olefin-alkyl compound mixture in the reaction zone and, within a preferred embodiment, the control of olefin current flow through such zone. Further, it has the advantage of aiding the cooling of the reaction mixture exiting from the reaction zone by pressure expansion or release, thereby freeing the latent heat, which in turn may be used for preheating newly added reaction mixture prior to its entry into the reaction zone. The pressure reduction and cooling thereby effected, which may be further aided by the heat exchange with freshly added reaction mixture, also serves to facilitate the separation of reaction products from the mixture exiting from the reaction zone.

We claim:

1. In the transalkylation of aluminum and boron alkyl compounds, having an alkyl radical of at least $C_2$, by heating a mixture of at least one such compound and at least one olefin, different from that corresponding to the alkyl radical of such compound to be replaced by such transalkylation, the improvement which comprises effecting the transalkylation reaction by subjecting such mixture for a reaction time of not less than substantially 0.1 second and not in excess of substantially 10 seconds to a temperature of reaction ranging from above about 200° C. to about 340° C.

2. In the transalkylation of aluminum and boron alkyl compounds, having an alkyl radical of at least $C_2$, by heating a mixture of at least one such compound and at least one olefin, different from that corresponding to the alkyl radical of such compound to be replaced by such transalkylation, the improvement which comprises effecting the transalkylation reaction by substantially continuously passing such mixture in a substantially fluid state through a reaction zone for a residence time of not less than substantially 0.1 second and not in excess of substantially 10 seconds while said mixture is at a temperature of reaction ranging from above about 200° C. to about 340° C.

3. Improvement according to claim 2 in which said temperature is substantially between about 280 and 320° C.

4. Improvement according to claim 2 in which said period of time is substantially from 0.5–1 second.

5. Improvement according to claim 2 in which said alkyl compound is an aluminum alkyl.

6. Improvement according to claim 5 in which said alkyl compound is an aluminum trialkyl.

7. Improvement according to claim 2 in which said alkyl compound is a boron trialkyl.

8. Improvement according to claim 2 in which said olefin is an alpha olefin.

9. Improvement according to claim 2 in which said alkyl compound is a boron trialkyl and in which said olefin is a cyclic olefin.

10. Improvement according to claim 2 in which said alkyl compound is a boron trialkyl and in which said olefin is one with an intermediate double bond.

11. Improvement according to claim 2 in which said alkyl compound is boron tripropyl and in which said olefin is 2-methyl pentene-(1).

12. Improvement according to claim 2 in which said olefin is ethylene and in which said mixture is maintained within said reaction zone at a pressure of at least about 2 atmospheres.

13. Improvement according to claim 12 in which said mixture is maintained in said reactiong zone at a pressure of about 2–10 atmospheres.

14. Improvement according to claim 2 in which the ratio of said olefin to said alkyl compound is from 5:1–100:1.

15. Improvement according to claim 14 in which said ratio is from 10:1–20:1.

16. Improvement according to claim 2 in which said olefin and said alkyl compound are so selected and mixed that said mixture constitutes substantially a single phase at said temperature.

17. Improvement according to claim 2 in which said olefin contains a number of carbon atoms lower than the number of carbon atoms of the alkyl radicals in said alkyl compound.

18. Improvement according to claim 2 in which said alkyl compound is an aluminum alkyl compound, the alkyl radical of which corresponds to a straight chain alpha olefin and in which said olefin is a straight chain alpha olefin present in stoichiometric excess to the amount necessary for the displacement of said alkyl radical.

19. Improvement according to claim 2 in which said alkyl compound is an aluminum alkyl compound, the alkyl radical of which corresponds to a branched chain alpha olefin and in which said olefin is a branched chain alpha olefin present in stoichiometric excess to the amount necessary for the displacement of said alkyl radical.

20. Improvement according to claim 2 in which a substantially continuously moving vapor phase current of such olefin is passed through said reaction zone, in which such alkyl compound is injected in substantially fluid condition into said current, prior to its entry into said reaction zone, to thereby constitute said mixture, in which the current exiting from said reaction zone is substantially continuously freed from the reaction products contained therein, in which unreacted olefin is substantially continuously recycled for injection with said alkyl compound and passage through said reaction zone, and in which said alkyl compound is injected at a rate to yield for said mixture a ratio of olefin to alkyl compound of substantially 5:1–100:1.

21. Improvement according to claim 20 in which the olefin of said continuously moving current is an alpha olefin, in which said mixture, while in said reaction zone, is under a pressure of at least about 2 atmospheres, and in which the current exiting from said reaction zone is cooled by at least partially releasing said pressure and by passing it into heat-exchange relation with the current of said mixture.

22. Improvement according to claim 21 in which said alpha olefin is a lower alpha olefin.

23. Improvement according to claim 22 in which said lower alpha olefin is ethylene.

24. Improvement according to claim 2 in which said olefin is ethylene and in which the mixture is maintained within said reaction zone at a pressure of about 2–30 atmospheres.

25. Improvement according to claim 2 in which said alkyl compound is an aluminum alkyl compound and in which said olefin is an olefin having a greater affinity for aluminum hydride than an olefin corresponding to the alkyl group of said alkyl aluminum compound.

26. Improvement according to claim 2 in which said alkyl compound is an aluminum alkyl compound and in which said olefin is an olefin having a substantially higher boiling point than an olefin corresponding to the alkyl group of said aluminum alkyl compound.

References Cited by the Examiner

UNITED STATES PATENTS

| | | | |
|---|---|---|---|
| 2,727,049 | 12/55 | Braconier et al. | 260—410.9 |
| 2,739,043 | 3/56 | Dexter | 23—260 |
| 2,776,323 | 1/57 | Foland et al. | 260—410.9 |
| 2,851,339 | 9/58 | Frey | 23—260 |
| 2,863,896 | 12/58 | Johnson | 260—448 |
| 2,906,763 | 9/59 | McKinnis | 260—448 |
| 2,976,306 | 3/61 | Walde | 260—448 |
| 3,014,941 | 12/61 | Walsh | 260—448 |
| 3,048,612 | 8/62 | Walde | 260—606.5 |

TOBIAS E. LEVOW, *Primary Examiner.*

ABRAHAM H. WINKELSTEIN, *Examiner.*

UNITED STATES PATENT OFFICE
CERTIFICATE OF CORRECTION

Patent No. 3,180,881                          April 27, 1965

Kurt Zosel et al.

It is hereby certified that error appears in the above numbered patent requiring correction and that the said Letters Patent should read as corrected below.

Column 3, line 23, for "olefin" read -- olefins --; column 7, line 39, for "residue" read -- residues --; column 9, line 25, for "278,410" read -- 2,781,410 --; column 14, line 75, for "$K[Al[(CH_2H_4)_{2,1}C_2H_5]_2Cl_2]$" read -- $K[Al[(C_2H_4)_{2,1}C_2H_5]_2Cl_2]$ --; column 15, line 12, for "135°" read -- 1350 --.

Signed and sealed this 14th day of September 1965.

(SEAL)
Attest:

ERNEST W. SWIDER                                  EDWARD J. BRENNER
Attesting Officer                                         Commissioner of Patents